US012561567B2

(12) United States Patent      (10) Patent No.:    US 12,561,567 B2

Srinivas et al.            (45) Date of Patent:      Feb. 24, 2026

(54) NEURAL NETWORK PRUNING WITH CYCLICAL SPARSITY

(71) Applicant: QUALCOMM Incorporated, San Diego, CA (US)

(72) Inventors: Suraj Srinivas, Amsterdam (NL); Tijmen Pieter Frederik Blankevoort, Amsterdam (NL); Andrey Kuzmin, Hilversum (NL); Markus Nagel, Amsterdam (NL); Marinus Willem Van Baalen, Amsterdam (NL); Andrii Skliar, Diemen (NL)

(73) Assignee: QUALCOMM Incorporated, San Diego, CA (US)

( * ) Notice: Subject to any disclaimer, the term of this patent is extended or adjusted under 35 U.S.C. 154(b) by 1129 days.

(21) Appl. No.: 17/456,318

(22) Filed: Nov. 23, 2021

(65) Prior Publication Data

US 2022/0245457 A1     Aug. 4, 2022

Related U.S. Application Data

(60) Provisional application No. 63/145,209, filed on Feb. 3, 2021.

(51) Int. Cl.
*G06N 3/082*      (2023.01)
*G06F 18/2136*    (2023.01)

(52) U.S. Cl.
CPC ......... *G06N 3/082* (2013.01); *G06F 18/2136* (2023.01)

(58) Field of Classification Search
CPC . G06N 3/082; G06N 3/04; G06N 3/08; G06F 18/2136; G06F 18/24143
See application file for complete search history.

(56) References Cited

U.S. PATENT DOCUMENTS

| | | | | |
|---|---|---|---|---|
| 11,030,528 | B1 * | 6/2021 | Zhuo | G06N 3/0495 |
| 2012/0158741 | A1 * | 6/2012 | Scholz | G06F 16/24578 |
| | | | | 707/748 |

(Continued)

FOREIGN PATENT DOCUMENTS

| | | | | |
|---|---|---|---|---|
| CN | 110033824 A | * | 7/2019 | G16B 25/10 |
| CN | 111126600 A | * | 5/2020 | G06N 3/08 |

OTHER PUBLICATIONS

CN111126600 with machine translation attached dated Aug. 19, 2025; publication dated May 8, 2020.*

(Continued)

*Primary Examiner* — James Trujillo

(74) *Attorney, Agent, or Firm* — Polsinelli LLP

(57)          ABSTRACT

Various embodiments include methods and devices for neural network pruning. Embodiments may include receiving as an input a weight tensor for a neural network, increasing a level of sparsity of the weight tensor generating a sparse weight tensor, updating the neural network using the sparse weight tensor generating an updated weight tensor, decreasing a level of sparsity of the updated weight tensor generating a dense weight tensor, increasing the level of sparsity of the dense weight tensor the dense weight tensor generating a final sparse weight tensor, and using the neural network with the final sparse weight tensor to generate inferences. Some embodiments may include increasing a level of sparsity of a first sparse weight tensor generating a second sparse weight tensor, updating the neural network using the second sparse weight tensor generating a second updated weight tensor, and decreasing the level of sparsity the second updated weight tensor.

30 Claims, 7 Drawing Sheets

400

(56) References Cited

U.S. PATENT DOCUMENTS

| 2020/0175314 A1* | 6/2020 | Fang | G06F 18/214 |
| 2020/0342327 A1* | 10/2020 | Dong | G06N 3/082 |
| 2020/0356860 A1* | 11/2020 | Kim | G06N 3/09 |
| 2021/0081798 A1* | 3/2021 | Cho | G06N 3/04 |
| 2021/0271975 A1* | 9/2021 | Chen | G06V 10/806 |
| 2022/0164652 A1* | 5/2022 | Aytekin | H03M 7/3068 |
| 2022/0261652 A1* | 8/2022 | Asad | G06F 18/2136 |
| 2023/0162477 A1* | 5/2023 | Li | G06V 10/764 |
| | | | 382/159 |

OTHER PUBLICATIONS

CN-110033824-A with machine translation attached on Aug. 19, 2025; publication dated Jul. 19, 2019.*

Hoefler T., et al., "Sparsity in Deep Learning: Pruning and Growth for Efficient Inference and Training In Neural Networks", arxiv.org, Cornell University Library, 201 Olin Library Cornell University Ithaca, NY 14853, Jan. 31, 2021 (Jan. 31, 2021), XP081871511, Sections 2.4.6 and 4. (90 pages).

International Search Report and Written Opinion—PCT/US2021/060710—ISA/EPO—Apr. 4, 2022. 13 pages.

Jia H., et al., "Drop Pruning for Model Compression", arxiv.org, Cornell University Library, 201 Olin Library Cornell University Ithaca, NY 14853, Dec. 5, 2018 (Dec. 5, 2018), XP080989450, Abstract, Sections 3.1 to 3.3 and 4. (10 pages).

* cited by examiner

400

NEURAL NETWORK PRUNING WITH CYCLICAL SPARSITY

RELATED APPLICATIONS

This application claims the benefit of priority to U.S. Provisional Patent Application No. 63/145,209 entitled "Neural Network Pruning With Cyclical Sparsity" filed Feb. 3, 2021, the entire contents of which are incorporated herein by reference.

BACKGROUND

Neural network training produces a weight tensor for implementation of a trained neural network. The weight tensor can be dense, having many non-zero values. Dense weight tensors are more resource costly compared to sparser weight tensors because dense weight tensor have more zero values. Dense weight tensor matrix multiplication requires more compute and power resources to execute than sparser weight tensor matrix multiplication. Dense weight tensors require more memory to store compared to sparser weight tensors. However, sparser weight tensors can increase error in and reduce accuracy of a neural network.

SUMMARY

Various disclosed aspects include apparatuses and methods for neural network pruning with cyclical sparsity. Various aspects may include receiving as an input a weight tensor for a neural network, increasing a level of sparsity of the weight tensor generating a sparse weight tensor, updating the neural network using the sparse weight tensor generating an updated weight tensor, decreasing a level of sparsity of the updated weight tensor generating a dense weight tensor, increasing the level of sparsity of the dense weight tensor generating a final sparse weight tensor, and using the neural network with the final sparse weight tensor to generate inferences.

Some aspects may include repeating a predetermined K number of times: increasing the level of sparsity of the weight tensor generating the sparse weight tensor, updating the neural network using the sparse weight tensor generating the updated weight tensor, and decreasing the level of sparsity of the updated weight tensor generating the dense weight tensor, in which increasing the level of sparsity of the dense weight tensor includes increasing the level of sparsity of the dense weight tensor following a Kth time, and decreasing the level of sparsity of the updated weight tensor includes decreasing the level of sparsity of the updated weight tensor to a predetermined level of sparsity.

In some aspects, the sparse weight tensor is a first sparse weight tensor and in which the updated weight tensor is a first updated weight tensor. Some aspects may include increasing a level of sparsity of the first sparse weight tensor generating a second sparse weight tensor, and updating the neural network using the second sparse weight tensor generating a second updated weight tensor, in which decreasing the level of sparsity of the updated weight tensor includes decreasing the level of sparsity of the second updated weight tensor.

Some aspects may include determining whether to increase the level of sparsity of the weight tensor, in which increasing the level of sparsity of the weight tensor includes increasing the level of sparsity of the weight tensor in response to determining to increase the level of sparsity of the weight tensor.

In some aspects, determining whether to increase the level of sparsity of the weight tensor includes determining whether an increase sparsity counter exceeds an increase sparsity counter threshold and, increasing the level of sparsity of the weight tensor includes increasing the level of sparsity of the weight tensor in response to determining that the increase sparsity counter exceeds the increase sparsity counter threshold.

Some aspects may include incrementing the increase sparsity counter for a cycle of updating the neural network.

In some aspects. increasing the level of sparsity of the weight tensor includes applying a mask to the weight tensor configured to convert a non-zero value of the weight tensor below a mask threshold to a zero value.

In some aspects, decreasing the level of sparsity of the updated weight tensor includes updating the neural network using the updated weight tensor.

Further aspects include a computing device having a processing device configured with executable instructions to perform operations of any of the methods summarized above. Further aspects include a computing device having means for performing functions of any of the methods summarized above. Further aspects include a non-transitory processor-readable medium having stored thereon processor-executable instructions configured to cause a processor and other components of a computing device to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
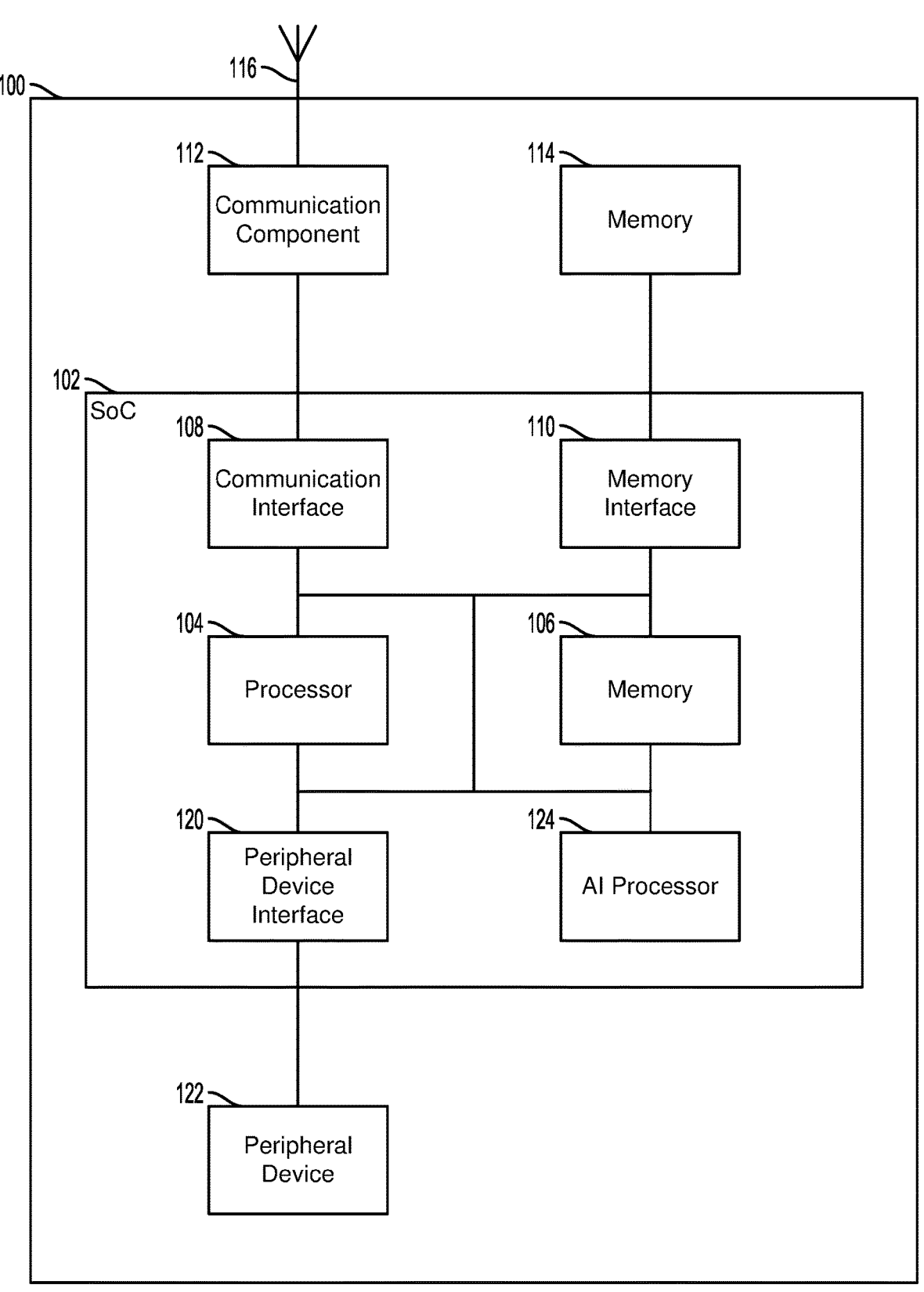
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "sparsity" is used herein to refer to a level of sparseness of a weight tensor. The term "increasing sparsity" is used herein to refer to increasing the level of sparseness of the weight tensor, such as by converting non-zero values of the weight tensor to zero values. The term "decreasing sparsity" is used herein to refer to decreasing the level of sparseness of the weight tensor, such as by converting zero values of the weight tensor to non-zero values through further training.

Various embodiments may include methods, and computing devices implementing such methods for neural network pruning with cyclical sparsity. Some embodiments, may include increasing sparsity of (effectively sparsifying) a dense weight tensor of a trained neural network to generate a weight tensor with more zero values, referred to herein as a sparser weight tensor. Some embodiments may further include updating the neural network with the generated sparse weight tensor (e.g., through further training), decreasing sparsity, thus effectively densifying the sparse weight tensor to generate a denser weight tensor with fewer zeros. Various embodiment may include repeating the operations of increasing sparsity of the generated denser weight tensor, updating, and decreasing sparsity of the sparser weight tensor until achieving a goal. In some embodiments, a level of sparsity of the generated sparser weight tensor may be increased during updating (e.g., further training) of the neural network with the sparser weight tensor. In some embodiments, decreasing sparsity of the sparser weight tensor may create a denser weight tensor that has a higher level of sparsity than the original dense weight tensor.

In various embodiments, the sparcer weight tensor generated by sparcifying the original dense weight tensor as well as densifying in subsequent repetitions of the operations of sparcifying and densifying may have a continuous spectrum of density or sparcity compared to the original dense weight tensor. For ease of reference, the term "sparce weight tensor" is used herein to refer to a weight tensor created or generated by operations of various embodiments to have a density less than (i.e., with greater sparcity) than the original dense weight tensor, and not to a particular level of sparcity. Similarly, a sparce weight tensor processed to decrease sparcity (i.e., densified), such as through further training, may be referred to as a dense weight tensor only to distinguish from the previous more sparce weight tensor, and not to indicate a particular level of density or sparcity. Thus, a weight tensor processed according to various embodiments may exhibit a spectrum of sparcity compared to the original dense weight tensor.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers (such as in vehicles and other larger systems), servers, multimedia computers, and game consoles.

Increasing sparsity of a weight tensor can be implemented for dense weight tensors, having many non-zero values, of trained neural networks to create sparse weight tensors, having fewer non-zero values, for use in implementing the trained neural networks. The sparse weight tensors have lower resource costs than their associated dense weight tensors. For example, sparse matrix multiplications are more compute & power efficient than dense matrix multiplications, and sparse weight tensors require less memory for storage. However, increased sparsity of the weight tensors for trained neural networks can decrease the accuracy of the computations and inferences of the trained neural networks. Different methods for increasing sparsity of the weight tensors can produce sparse weight tensors that cannot achieve a level of accuracy for a given level of sparsity, needing lower levels of sparsity to achieve the level of accuracy.

Embodiments described herein provide methods for neural network pruning with cyclical sparsity for which a given level of accuracy of the neural network may be achieved with a higher level of sparsity than known methods for increasing sparsity of a weight tensor of the neural network. As such, the embodiments described herein may improve the implementation of the neural network by reducing the resource cost for such implementation with a dense weight tensor of the neural network or a sparse weight tensor generated by other means for increasing sparsity of a weight tensor.

Sparsity of a dense weight tensor of a trained neural network may be increased, creating a sparse weight tensor. That sparse weight tensor may then be used to further update, such as by training, the neural network to produce inferences using the sparse weight tensor. In some embodiments, sparsity of the sparse weight tensor may be further increased during updating of the neural network, such as by further training the neural network. In some embodiments, sparsity of the dense weight tensor and/or the sparse weight tensor may be increased by applying a mask to the weight tensor, such as by multiplying values in the dense weight tensor by values in the mask (e.g., a matrix of the same dimensions as the dense weight tensor) that convert selected values to zero. For example, a mask may convert non-zero values of the dense weight tensor and/or the sparse weight tensor below a mask threshold to zero values. The mask threshold may be a threshold value used to generate a mask configured to convert non-zero values of the dense weight tensor and/or the sparse weight tensor that are below the mask threshold to zero values. As such, the mask threshold may be used to generate a masks specifically for a particular dense weight tensor and/or the sparse weight tensor. In some embodiments, the mask threshold may be uniform for all elements of the dense weight tensor and/or the sparse weight tensor. In some embodiments, the mask threshold may vary between elements of the dense weight tensor and/or the sparse weight tensor. For example, the mask threshold may vary between subsets of elements, as small a single element, of the elements of the dense weight tensor and/or the sparse weight tensor. In some embodiments, the mask threshold may be associated with a level of sparsity, and the mask threshold may be configured to achieve the level of sparsity for the dense weight tensor and/or the sparse weight tensor.

Sparsity of the sparse weight tensor may be decreased following training of the neural network using the sparse weight tensor to generate a dense weight tensor. In some embodiments, sparsity of the sparse weight tensor may be decreased by gradient update of the sparse weight tensor. In some embodiments, the sparsity of the sparse weight tensor may be decreased to a predetermined level of sparsity. In some embodiments, the dense weight tensor may have a higher level of sparsity than a previous dense weight tensor and a lower level of sparsity than the sparse weight tensor from which the dense weight tensor is derived.

Increasing sparsity of a weight tensor and/or decreasing sparsity of a weight tensor may be repeated for various iterations. Different iterations of increasing sparsity may have different rates at which to increase a level of sparsity. Decreasing the sparsity of the sparse weight tensor and sparsifying again may allow for recovery of weights that had been converted to zero values resulting in a decreased level of information. Masked non-zero weight values may be relearned through densifying of the sparse weight tensor and sparsifying of the dense weight tensor. For example, densifying of the sparse weight tensor may introduce non-zero weight values to locations in the weight tensor previously masked and converted to zero values. Different rates of increasing sparsity may allow for previously masked weight values to be relearned and updated during a subsequent iteration of increasing sparsity as a value that may not be subsequently masked.

Increasing sparsity of a weight tensor and/or decreasing sparsity of a weight tensor may be repeated until a goal or threshold level of sparsity in the trained neural network is reached. For example, the goal may be a predetermined level of sparsity of the sparse weight tensor. As another example, the goal may be a level of accuracy for the neural network using the sparse weight tensor having a level of sparsity. As another example, the goal may be a number of times the neural network is trained using sparse weight tensors. As another example, the goal may be a number of cycles of increasing sparsity of the weight tensor and/or decreasing sparsity of the weight tensor. The cycles of increasing sparsity of the weight tensor followed by decreasing sparsity of the weight tensor may be repeated a predetermined number "K" of cycles, where K is a positive integer. The K number of cycles of increasing sparsity of the weight tensor and decreasing sparsity of the weight tensor may be followed by an additional cycle of increasing sparsity of the weight tensor. In some embodiments, the goal may be any number or combination of these examples. In some embodiments, there may be one more cycle of increasing sparsity of the weight tensor than decreasing sparsity of the weight tensor, such that K=L+1, in which K is the number of number cycles of increasing sparsity and L is the number of cycles of decreasing sparsity of the weight tensor applied in an application of some embodiments to the original dense weight tensor.

FIG. 1 illustrates a system including a computing device 100 suitable for use with various embodiments. The computing device 100 may include an SoC 102 with a processor 104, a memory 106, a communication interface 108, a memory interface 110, and a peripheral device interface 120. The computing device 100 may further include a communication component 112, such as a wired or wireless modem, a memory 114, an antenna 116 for establishing a wireless communication link, and/or a peripheral device 122. The processor 104 may include any of a variety of processing devices, for example a number of processor cores.

The term "system-on-chip" or "SoC" is used herein to refer to a set of interconnected electronic circuits typically, but not exclusively, including a processing device, a memory, and a communication interface. A processing device may include a variety of different types of processors 104 and/or processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and/or a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and/or time references. Integrated circuits may be configured such that the components of the integrated circuit reside on a single piece of semiconductor material, such as silicon.

An SoC 102 may include one or more processors 104. The computing device 100 may include more than one SoC 102, thereby increasing the number of processors 104 and processor cores. The computing device 100 may also include processors 104 that are not associated with an SoC 102. Individual processors 104 may be multicore processors. The processors 104 may each be configured for specific purposes that may be the same as or different from other processors 104 of the computing device 100. One or more of the processors 104 and processor cores of the same or different configurations may be grouped together. A group of processors 104 or processor cores may be referred to as a multi-processor cluster.

The memory 106 of the SoC 102 may be a volatile or non-volatile memory configured for storing data and processor-executable code for access by the processor 104 or by other components of SoC 102, including an AI processor 124. The computing device 100 and/or SoC 102 may include one or more memories 106 configured for various purposes. One or more memories 106 may include volatile memories such as random access memory (RAM) or main memory, or cache memory. These memories 106 may be configured to temporarily hold a limited amount of data received from a data sensor or subsystem, data and/or processor-executable code instructions that are requested from non-volatile memory, loaded to the memories 106 from non-volatile memory in anticipation of future access based on a variety of factors, and/or intermediary processing data and/or processor-executable code instructions produced by the processor 104 and/or AI processor 124 and temporarily stored for future quick access without being stored in non-volatile memory. In some embodiments, any number and combination of memories 106 may include one-time programmable or read-only memory.

The memory 106 may be configured to store data and processor-executable code, at least temporarily, that is loaded to the memory 106 from another memory device, such as another memory 106 or memory 114, for access by one or more of the processors 104 or by other components of SoC 102, including the AI processor 124. The data or processor-executable code loaded to the memory 106 may be loaded in response to execution of a function by the processor 104 or by other components of SoC 102, including the AI processor 124. Loading the data or processor-executable code to the memory 106 in response to execution of a function may result from a memory access request to the memory 106 that is unsuccessful, or a "miss," because the requested data or processor-executable code is not located in the memory 106. In response to a miss, a memory access request to another memory 106 or memory 114 may be made to load the requested data or processor-executable code from the other memory 106 or memory 114 to the memory 106. Loading the data or processor-executable code to the memory 106 in response to execution of a function may result from a memory access request to another memory 106 or memory 114, and the data or processor-executable code may be loaded to the memory 106 for later access.

The memory interface 110 and the memory 114 may work in unison to allow the computing device 100 to store data and processor-executable code on a volatile and/or non-volatile storage medium, and retrieve data and processor-executable code from the volatile and/or non-volatile storage medium. The memory 114 may be configured much like an embodiment of the memory 106 in which the memory 114 may store the data or processor-executable code for access by one or more of the processors 104 or by other components of SoC 102, including the AI processor 124. In some embodiments, the memory 114, being non-volatile, may retain the information after the power of the computing device 100 has been shut off. When the power is turned back on and the computing device 100 reboots, the information stored on the memory 114 may be available to the computing device 100. In some embodiments, the memory 114, being volatile, may not retain the information after the power of the computing device 100 has been shut off. The memory interface 110 may control access to the memory 114 and allow the processor 104 or other components of the SoC 102, including the AI processor 124, to read data from and write data to the memory 114.

An SoC 102 may also include an AI processor 124. The AI processor 124 may be a processor 104, a portion of a processor 104, and/or a standalone component of the SoC 102. The AI processor 124 may be configured to train and/or execute neural networks for processing activation values and weight values on the computing device 100. The computing device 100 may also include AI processors 124 that are not associated with the SoC 102. Such AI processors 124 may be standalone components of the computing device 100 and/or integrated into other SoCs 102.

Some or all of the components of the computing device 100 and/or the SoC 102 may be arranged differently and/or combined while still serving the functions of the various embodiments. The computing device 100 may not be limited to one of each of the components, and multiple instances of each component may be included in various configurations of the computing device 100.

Figure 2:
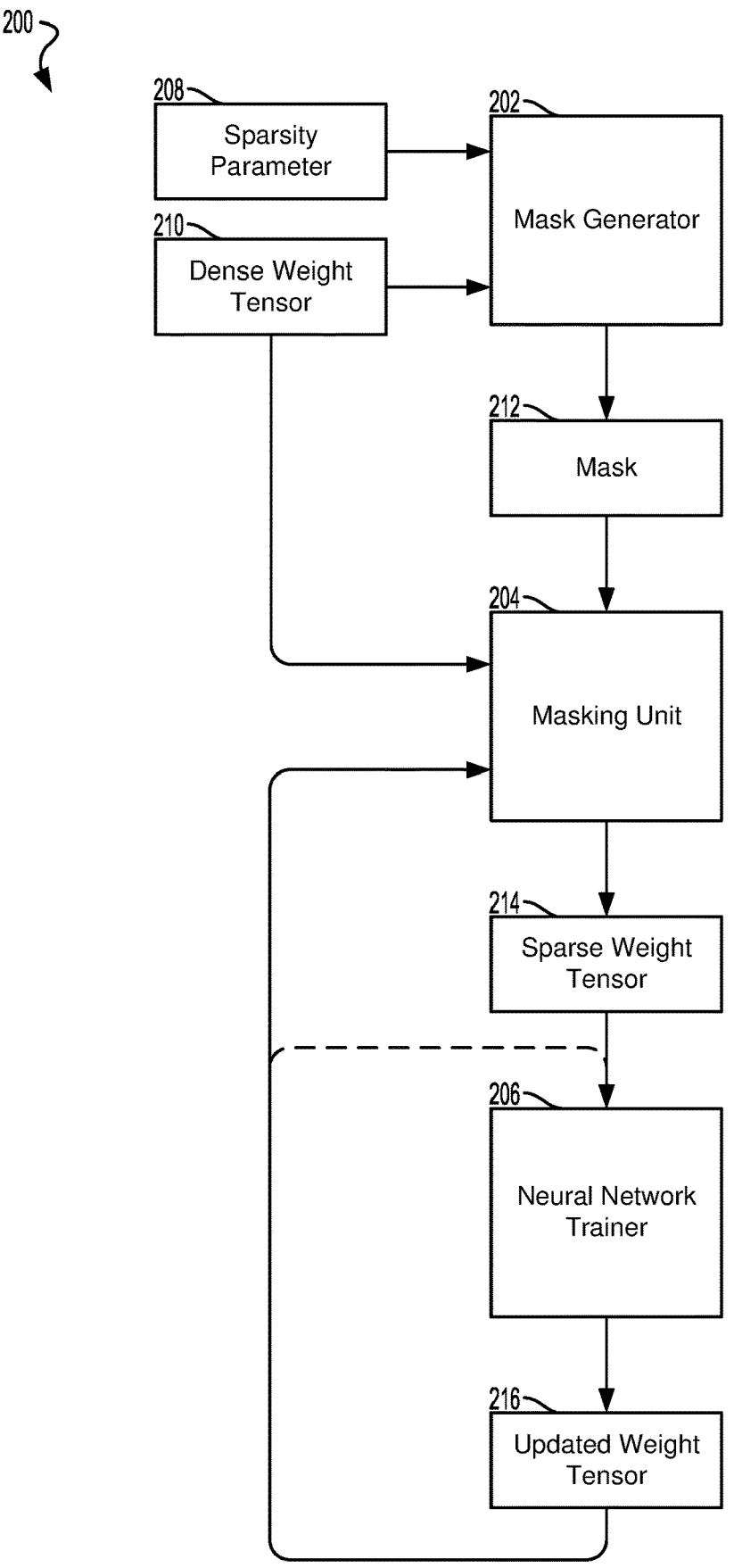
FIG. 2 is a component block and flow diagram illustrating an example system for neural network pruning with cyclical sparsity suitable for implementing various embodiments.

FIG. 2 illustrates an example system 200 for pruning of an input neural network via cyclically sparcifying and densifying according to various embodiments. With reference to FIGS. 1 and 2, a computing device (e.g., computing device 100 in FIG. 1) may implement the system 200 using a mask generator 202, a masking unit 204, and a neural network trainer 206. In some embodiments, a processor (e.g., processor 104, AI processor 124 in FIG. 1) may be configured to implement the system 200, including any number and combination of the mask generator 202, the masking unit 204, and the neural network trainer 206. In some embodiments, any number and combination of the components of the system 200, including the mask generator 202, the masking unit 204, and the neural network trainer 206, may be implemented in dedicated hardware.

An input to the system 200 may be a dense weight tensor 210 of a trained neural network. The dense weight tensor 210 may have a given size and shape (i.e., dimensions), and exhibit an initial level of density.

The mask generator 202 may be configured to generate masks for increasing sparsity of dense weight tensors. The mask generator 202 may generate masks of the same size and shape as an input dense weight tensor 210 to be masked. In some embodiments, the mask generator 202 may determine and/or receive parameters of the size and shape of the input dense weight tensor 210 to be masked. For example, the mask generator 202 may determine the size and shape of the received input dense weight tensor 210. As another example, the mask generator 202 may receive parameters of the size and shape of the input dense weight tensor 210 that is received or will be received as an input.

In some embodiments, the mask generator 202 may receive and/or determine a sparsity parameter 208. For example, the sparsity parameter 208 may be a goal level of sparsity for a final sparse weight tensor. As another example, the sparsity parameter 208 may be a sparsity profile that may indicate to the mask generator 202 a rate at which to increase a level of sparsity for a sparse weight tensor. The rate may indicate how much to increase a level of sparsity for a sparse weight tensor and/or after how many updating cycles, such as training cycles, to increase the level of sparsity for the sparse weight tensor. In some embodiments, the sparsity parameter 208 may be any number and combination of the foregoing examples.

Based on the size and shape of the input dense weight tensor 210 and the sparsity parameter 208, the mask generator 202 may generate a mask 212. The mask 212 may be configured to increase sparsity of the weight tensor. The mask 212 may convert certain non-zero values of a weight tensor to zero values, increasing sparsity of the weight tensor. In some but not all embodiments, the mask generator 202 may generate a mask 212 with a mask threshold, and non-zero values below the mask threshold may be converted to zero values. In such embodiments, the mask threshold may be associated with a level of sparsity, and the mask threshold may be configured to achieve the level of sparsity for the weight tensor. For example, the mask threshold may be set to a value at which a certain number, fraction, percentage, etc. of values of the weight tensor would be zero values after applying the mask 212 to the weight tensor. Optionally, in some embodiments, the mask generator 202, masking unit 204 and mask 212 may be implemented within a unit or operations that functions as a sparsity/sparsification engine or module in which the operations described herein are performed.

The masking unit 204 may be configured to apply the mask 212 to the weight tensor. The masking unit 204 may compare the values of the weight tensor to the mask threshold and convert the values below the mask threshold to zero values. The mask 212 may be applied to the input dense weight tensor 210. In some embodiments, the mask 212 may be configured to increase sparsity of an updated weight tensor 216 as described further herein. The masking unit 204 may generate a sparse weight tensor 214 by applying the mask 212 to the weight tensor 210, 216.

The neural network trainer 206 may update the trained neural network such as by training using the sparse weight tensor 214. The neural network may be any sort of neural network, such as a feedforward neural network, a radial basis function neural network, a recurrent neural network, memory neural network, etc. The neural network trainer 206 may implement known updating and/or training methods to update the weight tensor, such as gradient decent, the Newton method, the Levenberg-Marquardt algorithm, etc. Training the neural network may produce an updated weight tensor 216.

Generating and/or updating the sparse weight tensor 214 may have the effect of pruning the neural network. By introducing zero values to the weight tensors, the corresponding nodes of the neural network may produce zero value results, null results, etc., thus foregoing performing multiplications of nodes of the neural network in which one of the inputs is zero.

The neural network trainer 206 may also use an updated weight tensor 216 to generate an updated weight tensor 216 that is a dense weight tensor. In some embodiments, to use the updated weight tensor 216 to generate an updated weight tensor 216 that is a dense weight tensor, the mask generator 202 may generate a mask 212, that when applied to the updated weight tensor 216 by the masking unit 204, may not change any values of the updated weight tensor 216. In some embodiments, to use the updated weight tensor 216 to generate an updated weight tensor 216 that is a dense weight tensor, the neural network trainer 206 may directly use the updated weight tensor 216, bypassing the masking unit 204. Generating the dense weight tensor may recapture some weights that were previously masked, which may reduce the likelihood and effects of over pruning the neural network. The updated weight tensor 216 that is a dense weight tensor may have a level of sparsity greater than the input dense weight tensor 210 and less than at least one of the previous sparse weight tensors 214.

The system 200 may be configured to alternate between cycles of increasing sparsity of weight tensors and decreasing sparsity of weight tensors. For example, the system 200 may increase sparsity of weight tensors for a number times before implementing a cycle of decreasing sparsity of weight tensors. As another example, the system 200 may increase sparsity of weight tensors until an updated weight tensor 216 achieves a level of sparsity before implementing a cycle of decreasing sparsity of weight tensors. As another example, the system 200 may increase sparsity of weight tensors until the neural network achieves a level of accuracy and a level of sparsity for an updated weight tensor 216 before implementing a cycle of decreasing sparsity of weight tensors. In some embodiments, the system 200 may be configured to implement a cycle of increasing sparsity of weight tensors for any number and combination of the foregoing examples before implementing a cycle of decreasing sparsity of weight tensors. In some embodiments, the system 200 may impose different parameters and/or requirement for increasing sparsity of weight tensors and/or decreasing sparsity of weight tensors for successive cycles. In some embodiments, the system 200 may similarly end neural network pruning with cyclical sparsity at the completion of a cycle of increasing sparsity of weight tensors based on any number and combination of these examples.

Different iterations of increasing sparsity may have different rates at which to increase a level of sparsity. As noted above, decreasing the sparsity of the sparse weight tensor 214 and sparsifying the updated weight tensor 216 may allow for recovery of weights masked erroneously. Masked non-zero weight values may be relearned through densifying of the sparse weight tensors 214 and sparsifying of the updated weight tensor 216. For example, densifying of the sparse weight tensor 214 may introduce non-zero weight values to locations in the weight tensor previously masked and converted to zero values. Different rates of increasing sparsity may allow for previously masked weight values to be relearned and updated during a subsequent iteration of increasing sparsity as a value that may not be subsequently masked.

Figure 3:
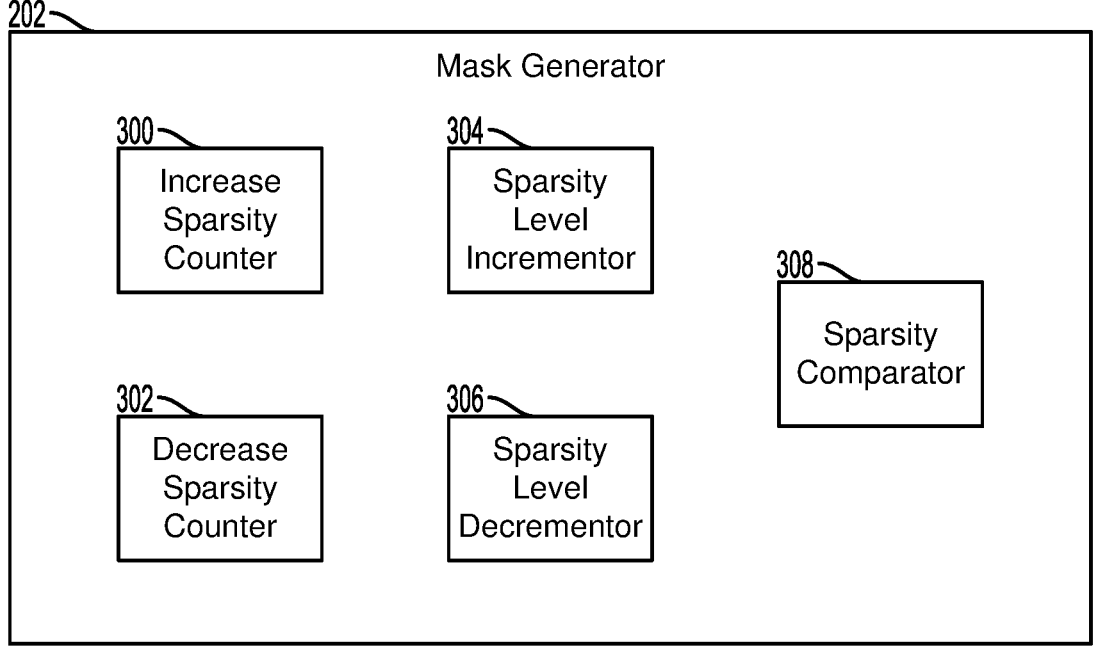
FIG. 3 is component block illustrating an example mask generator for neural network pruning with cyclical sparsity suitable for implementing various embodiments.

FIG. 3 illustrates an example mask generator 202 for neural network pruning with cyclical sparsity suitable for implementing various embodiments. With reference to FIGS. 1-3, a computing device (e.g., computing device 100 in FIG. 1) may implement the mask generator 202 having any number and combination of an increase sparsity counter 300, a decrease sparsity counter 302, a sparsity level incrementor 304, a sparsity level decrementor 306, and a sparsity comparator 308. In some embodiments, a processor (e.g., processor 104, AI processor 124 in FIG. 1) may be configured to implement the mask generator 202, including any number and combination of the increase sparsity counter 300, the decrease sparsity counter 302, the sparsity level incrementor 304, the sparsity level decrementor 306, and the sparsity comparator 308. In some embodiments, any number and combination of the components of the mask generator 202, including any number and combination of the increase sparsity counter 300, the decrease sparsity counter 302, the sparsity level incrementor 304, the sparsity level decrementor 306, and the sparsity comparator 308, may be implemented in dedicated hardware.

The sparsity level incrementor 304 may be configured to control the level of sparsity used for generating a mask (e.g., mask 212 in FIG. 2). The sparsity level incrementor 304 may increase the level of sparsity in various manners. For example, the sparsity level incrementor 304 may increase the level of sparsity linearly. As another example, the sparsity level incrementor 304 may increase the level of sparsity non-linearly.

In some embodiments, the sparsity level incrementor 304 may increase the level of sparsity according to a sparsity profile designating values, such as numerically, of various levels of sparsity, and the sparsity level incrementor 304 may select successively increasing values. In some embodiments, the sparsity level incrementor 304 may increase the level of sparsity according to a sparsity profile designating values, such as algorithmically, of various levels of sparsity, and the sparsity level incrementor 304 may calculate successively increasing values.

In some embodiments, the sparsity level incrementor 304 may use various factors for control the level of sparsity used for generating a mask. For example, the sparsity level incrementor 304 may use a sparsity parameter (e.g., sparsity parameter 208 in FIG. 2) to control the level of sparsity used for generating a mask. As another example, the sparsity level incrementor 304 may use a number of cycles of updating a neural network by a neural network trainer (e.g., neural network trainer 206 in FIG. 2), such as by training the neural network, to control the level of sparsity used for generating a mask. As another example, the sparsity level incrementor 304 may use an accuracy value of the neural network to control the level of sparsity used for generating a mask. As another example, the sparsity level incrementor 304 may use a previously set level of sparsity set by the sparsity level incrementor 304 to control the level of sparsity used for generating a mask. As another example, the sparsity level incrementor 304 may use a previously set level of sparsity set by the sparsity level decrementor 306 to control the level of sparsity used for generating a mask. In some embodiments, the sparsity level incrementor 304 may use any number and combination of these examples to control the level of sparsity used for generating a mask.

In some embodiments, the increase sparsity counter 300 may increment and keep track of a number updating (e.g., training) cycles implemented by the neural network trainer. The increase sparsity counter 300 may be configured to trigger the sparsity level incrementor 304 to increase a level of sparsity used for generating the mask upon reaching a designated value. In some embodiments, the increase sparsity counter 300 may use a sparsity parameter to indicate to the increase sparsity counter 300 the designated value for comparison to the number of updating (e.g., training) cycles implemented by the neural network trainer. In some embodiments, the increase sparsity counter 300 may increment and keep track of a number cycles of increasing sparsity of weight tensors implemented by a computing system (e.g., system 200 in FIG. 2).

The sparsity level decrementor 306 may be configured to control the level of sparsity used for generating a mask (e.g., mask 212 in FIG. 2). The sparsity level decrementor 306 may decrease the level of sparsity in various manners. For example, the sparsity level decrementor 306 may decrease the level of sparsity to a predetermined level of sparsity. As another example, the sparsity level decrementor 306 may decrease the level of sparsity to a level lower than the sparsity level of the sparsity level incrementor 304. As another example, the sparsity level decrementor 306 may decrease the level of sparsity to a level higher than the sparsity level of a dense weight tensor (e.g., input dense weight tensor 210 in FIG. 2) for the trained neural network. As another example, the sparsity level decrementor 306 may decrease the level of sparsity to a level as low as zero. In some embodiments, the sparsity level decrementor 306 may decrease the level of sparsity according to a sparsity profile designating values, such as numerically, of various levels of sparsity. In some embodiments, the sparsity level decrementor 306 may decrease the level of sparsity according to a sparsity profile designating values, such as algorithmically, of various levels of sparsity.

In some embodiments, the sparsity level decrementor 306 may use various factors for control the level of sparsity used for generating a mask. For example, the sparsity level decrementor 306 may use a sparsity parameter to control the level of sparsity used for generating a mask. As another example, the sparsity level decrementor 306 may use a number of cycles of updating, or training, of a neural network by a neural network trainer to control the level of sparsity used for generating a mask. As another example, the sparsity level decrementor 306 may use an accuracy value of the neural network to control the level of sparsity used for generating a mask. As another example, the sparsity level decrementor 306 may use a previously set level of sparsity set by the sparsity level incrementor 304 to control the level of sparsity used for generating a mask. As another example, the sparsity level decrementor 306 may use a previously set level of sparsity set by the sparsity level decrementor 306 to control the level of sparsity used for generating a mask. In some embodiments, the sparsity level decrementor 306 may use any number or combination of these examples to control the level of sparsity used for generating a mask.

In some embodiments, the decrease sparsity counter 302 may increment and keep track of a number updating, or training, cycles implemented by the neural network trainer. The decrease sparsity counter 302 may be configured to trigger the sparsity level decrementor 306 to decrease a level of sparsity used for generating the mask upon reaching a designated value. In some embodiments, the decrease sparsity counter 302 may use a sparsity parameter to indicate to the decrease sparsity counter 302 the designated value for comparison to the number of updating, or training, cycles implemented by the neural network trainer. In some embodiments, the decrease sparsity counter 302 may be configured to trigger the increase sparsity counter 300 to reset the count of the number updating, or training, cycles implemented by the neural network trainer. In some embodiments, the decrease sparsity counter 302 may increment and keep track of a number of cycles of decreasing sparsity of weight tensors implemented by the system.

In some embodiments, the sparsity comparator 308 may determine whether to end neural network pruning with cyclical sparsity for the neural network. For example, the sparsity comparator 308 may compare the value of the increase sparsity counter 300 to an increase sparsity counter threshold and the value of the decrease sparsity counter 302 to a decrease sparsity counter threshold, and trigger the mask generator 202 to cease generating masks for the neural network in response to the value of the increase sparsity counter 300 exceeding the increase sparsity counter threshold and/or the value of the decrease sparsity counter 302 exceeding the decrease sparsity counter threshold.

The values of the increase sparsity counter 300 and the decrease sparsity counter 302 may be the number of cycles of increasing sparsity of weight tensors and the number of cycles of decreasing sparsity of weight tensors. The increase sparsity counter threshold may be configured for a predetermined number of cycles of increasing sparsity of weight tensors "K+1" and the decrease sparsity counter threshold may be configured for a predetermined number of cycles of decreasing sparsity of weight tensors "K." The values of the increase sparsity counter 300 and the decrease sparsity counter 302 may be the number of updating, or training, cycles implemented by the neural network trainer.

In some embodiments, the sparsity comparator 308 may compare the level of sparsity used to generate the mask to a sparsity threshold and the value of the increase sparsity counter 300 to the increase sparsity counter threshold, and trigger the mask generator 202 to cease generating masks for the neural network in response to both the level of sparsity used to generate the mask exceeding the sparsity threshold and the value of the increase sparsity counter 300 exceeding the increase sparsity counter threshold.

In some embodiments, the sparsity comparator 308 may compare an accuracy of the neural network to an accuracy threshold and compare the level of sparsity used to generate the mask to the sparsity threshold, and trigger the mask generator 202 to cease generating masks for the neural network in response to both the accuracy of the neural network exceeding the accuracy threshold and the level of sparsity used to generate the mask exceeding the sparsity threshold. In some embodiments, the sparsity comparator 308 may use a sparsity parameter to inform any number and combination of the increase sparsity counter threshold, the decrease sparsity counter threshold, the sparsity threshold, and the accuracy threshold. In some embodiments, the sparsity comparator 308 may use any number ore combination of these examples to determine whether to end neural network pruning with cyclical sparsity for the neural network.

Figure 4:
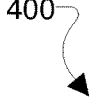
FIG. 4 is a graph diagram illustrating an example of neural network pruning with cyclical sparsity suitable for implementing various embodiments.
Figure 4:
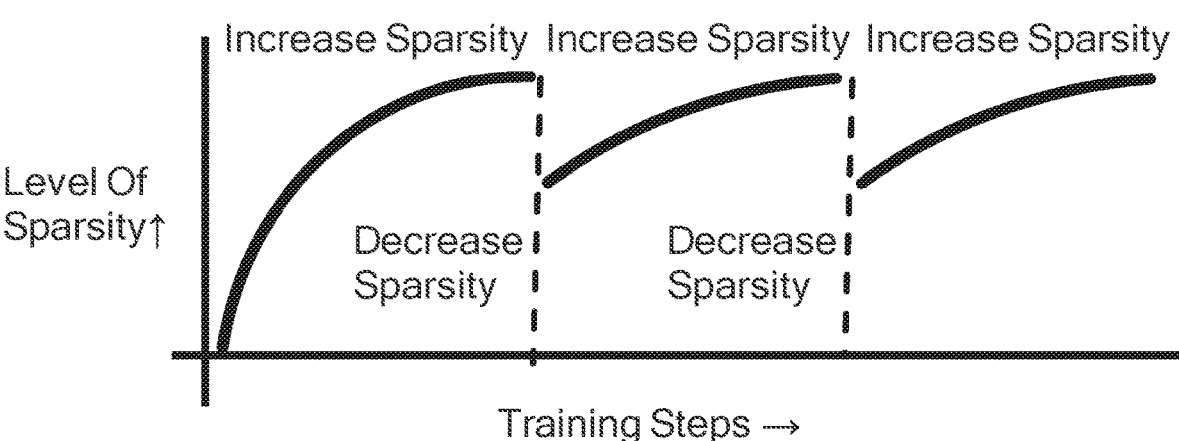

FIG. 4 illustrates an example graph 400 of neural network pruning with cyclical sparsity suitable for implementing various embodiments. With reference to FIGS. 1-4, the graph 400 illustrates a plotting of sparsity values, also referred to as levels of sparsity, to training steps, also referred to as cycles of updating, or training, of the neural network. The graph 400 illustrates that a first cycle of increasing sparsity of weight tensors may begin with a lowest sparsity value for the neural network pruning with cyclical sparsity. During the first cycle of increasing sparsity of weight tensors, the sparsity values may be increased as the number of updating, or training, steps increase. For example, a mask (e.g., mask 212 in FIG. 2) may be configured to increase the sparsity of a weight tensor (e.g., sparse weight tensor 214 in FIG. 2) used to update, such as by training, the neural network as updating is implemented and the number of training steps increase.

At the end of the first cycle of increasing sparsity of weight tensors, a first cycle of decreasing sparsity of weight tensors may be implemented. As discussed herein, decreasing sparsity of weight tensors may reduce the sparsity value of the weight tensor used to update, or train, the neural network. For example, the sparsity value of the weight tensor may be reduced to a predetermined level of sparsity. As another example, the sparsity value of the weight tensor may be reduced to between the lowest sparsity value in the first cycle of increasing sparsity of weight tensors and the highest sparsity value in the first cycle of increasing sparsity of weight tensors.

As such, at the start of a second cycle of increasing sparsity of weight tensors, the sparsity value of the weight tensor used to update, or train, the neural network may be between the lowest sparsity value in the first cycle of increasing sparsity of weight tensors and the highest sparsity value in the first cycle of increasing sparsity of weight tensors. During the second cycle of increasing sparsity of weight tensors, the sparsity values may be increased as the number of training steps increase.

At the end of the second cycle of increasing sparsity of weight tensors, a second cycle of decreasing sparsity of weight tensors may be implemented reducing the sparsity value of the weight tensor used to update, or train, the neural network. For example, the sparsity value of the weight tensor may be reduced to a predetermined level of sparsity. As another example, the sparsity value of the weight tensor may be reduced to between the lowest sparsity value in the first cycle of increasing sparsity of weight tensors and the highest sparsity value in the second cycle of increasing sparsity of weight tensors. In some embodiments, the sparsity value of the weight tensor for the second cycle of decreasing sparsity of weight tensors may be the same or different from the sparsity value of the weight tensor for the first cycle of decreasing sparsity of weight tensors.

As such, at the start of a third cycle of increasing sparsity of weight tensors, the sparsity value of the weight tensor used to update, or train, the neural network may be between the lowest sparsity value in the first cycle of increasing sparsity of weight tensors and the highest sparsity value in the second cycle of increasing sparsity of weight tensors. During the third cycle of sparsification, the sparsity values may be increased as the number of training steps increase.

The third cycle of increasing sparsity of weight tensors may end the neural network pruning with cyclical sparsity. The neural network pruning with cyclical sparsity may end based on various factors, such as completion of a number of cycles of increasing sparsity of weight tensors, completion of a number of training steps, achievement of a sparsity value, and/or achievement of an accuracy of the neural network.

The example illustrated in FIG. 4 shows three cycles of increasing sparsity of weight tensors and two cycles of decreasing sparsity of weight tensors. However, the claims and the specification are not limited to the number of cycles of increasing sparsity of weight tensors and decreasing sparsity of weight tensors. In some embodiment, neural network pruning with cyclical sparsity may include two or more cycles of increasing sparsity of weight tensors and one or more cycles of decreasing sparsity of weight tensors. In some embodiments, neural network pruning with cyclical sparsity may include one more cycle of increasing sparsity of weight tensors than cycles of decreasing sparsity of weight tensors. The cycles of increasing sparsity of the weight tensor followed by decreasing sparsity of the weight tensor may be repeated a predetermined number "K" of cycles, where K is a positive integer. The K number of cycles of increasing sparsity of the weight tensor and/or decreasing sparsity of the weight tensor may be followed by an additional cycle of increasing sparsity of the weight tensor.

The example illustrated in FIG. 4 further shows neural network pruning with cyclical sparsity for which gradual pruning is implemented for each cycle of increasing sparsity of weight tensors by increasing the sparsity values during each cycle of sparsification in a polynomial manner. However, the claims and the specification are not limited to the manner of increasing the sparsity values during each cycle of increasing sparsity of weight tensors illustrated in FIG. 4. In some embodiments, neural network pruning with cyclical sparsity may include one more increase of the sparsity values per cycle of increasing sparsity of weight tensors. In some embodiments, neural network pruning with cyclical sparsity may include increasing the sparsity values during each cycle of increasing sparsity of weight tensors in various manners, including linearly and/or nonlinearly. In some embodiments, neural network pruning with cyclical sparsity may include different manners by which to increase the sparsity values during different cycles of increasing sparsity of weight tensors.

Figure 5:
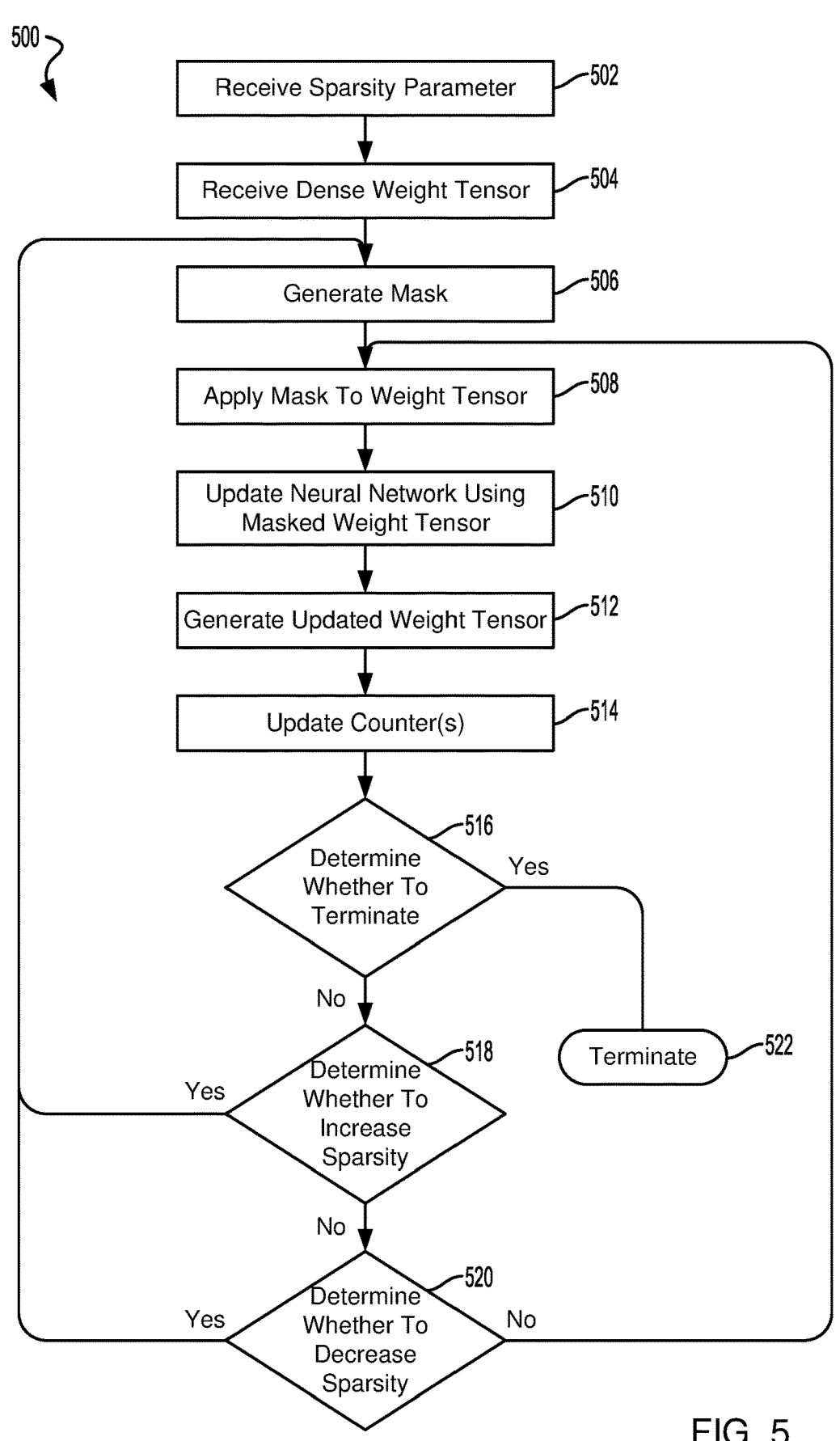
FIG. 5 is a process flow diagram illustrating a method for neural network pruning with cyclical sparsity according to an embodiment

FIG. 5 illustrates a method 500 for neural network pruning with cyclical sparsity according to an embodiment. With reference to FIGS. 1-5, the method 500 may be implemented in a computing device (e.g., computing device 100 in FIG. 1), in general purpose hardware, in dedicated hardware, in software executing in a processor (e.g., processor 104 or AI processor 124 in FIG. 1), or in a combination of a software-configured processor and dedicated hardware. For example, the method 500 may be implemented as a processor (e.g., processor 104, AI processor 124 in FIG. 1) executing software within a neural network pruning with cyclical sparsity system (e.g., system 200 in FIG. 2) that includes other individual components, and various memory/cache controllers. In order to encompass the alternative configurations enabled in various embodiments, the hardware implementing the method 500 is referred to herein as an "processing device."

In block 502, the processing device may receive a sparsity parameter (e.g., sparsity parameter 208 in FIG. 2). In some embodiments, the sparsity parameter may be set by a user of the computing device. In some embodiments, the sparsity parameter may be predetermined. In some embodiments, the sparsity parameter may be specific to a neural network. In some embodiments, the sparsity parameter may be specific to a computing device. In some embodiments, the sparsity parameter may be specific to a use case for the neural network. In some embodiments, the sparsity parameter may include a level of sparsity for a final weight tensor. In some embodiments, the sparsity parameter may include a level accuracy of a neural network. In some embodiments, the sparsity parameter may include a sparsity profile that may indicate to the processing device a rate at which to increase a level of sparsity for a sparse weight tensor (e.g., sparse weight tensor 214 in FIG. 2). The rate may indicate how much to increase a level of sparsity for a sparse weight tensor and/or after how many updating, or training, cycles to increase the level of sparsity for the sparse weight tensor. In some embodiments, the sparsity parameter may include a sparsity profile that may indicate to the processing device a rate at which to decrease a level of sparsity for a sparse weight tensor. The rate may indicate how much to decrease a level of sparsity for a sparse weight tensor and/or after how many updating, or training, cycles to decrease the level of sparsity for the sparse weight tensor. For example, the level of sparsity for a sparse weight tensor may be decreased to a predetermined level of sparsity. As a further example, the level of sparsity for a sparse weight tensor may be decreased after as few as a single updating, or training, cycle. In some embodiments, the sparsity parameter may include any number and combination of an increase sparsity counter threshold, a decrease sparsity counter threshold, a sparsity threshold, and an accuracy threshold. In some embodiments, the sparsity parameter may include any number and combination of these examples. In some embodiments, the processing device receiving the sparsity parameter in block 502 may be a processor, an AI processor, a neural network pruning with cyclical sparsity system, and/or a mask generator (e.g., mask generator 202 in FIGS. 2 and 3).

In block 504, the processing device may receive a dense weight tensor (e.g., input dense weight tensor 210 in FIG. 2). The dense weight tensor may be a weight tensor resulting from updating, such as by training, a neural network for which neural network pruning with cyclical sparsity may be implemented. In some embodiments, the processing device receiving the dense weight tensor in block 504 may be a processor, an AI processor, a neural network pruning with cyclical sparsity system, and/or a mask generator and/or a masking unit (e.g., masking unit 204 in FIG. 2).

In block 506, the processing device may generate a mask (e.g., mask 212 in FIG. 2). The processing device may generate masks of the same size and shape as a weight tensor to be masked. In some embodiments, the processing device may determine and/or receive parameters of the size and shape of the weight tensor to be masked. For example, the processing device may determine the size and shape of the dense weight tensor received in block 504. As another example, the processing device may receive parameters of the size and shape of the dense weight tensor, such as part of the sparsity parameter received in block 502. The mask may be configured to increase sparsity of the weight tensor. The mask may be configured to convert certain non-zero values of the weight tensor to zero values, increasing sparsity of the weight tensor. In some embodiments, the processing device may generate the mask with a mask threshold, and non-zero values below the mask threshold may be converted to zero values. The mask threshold may be associated with a level of sparsity, and the mask threshold may be configured to achieve the level of sparsity for the weight tensor. For example, the mask threshold may be set to a value at which a certain number, fraction, percentage, etc. of values of the weight tensor would be zero values after applying the mask to the weight tensor. In some embodiments, the mask may be configured to decrease sparsity of the weight tensor. For example, the mask may be configured with a level of sparsity that may not increase sparsity of the weight tensor, allowing the weight tensor to remain as is. As such, the weight tensor may be denser than a previous weight tensor for which sparsity was increased. In some embodiments, the processing device may forego generating the mask for decreasing sparsity of the weight tensor. In some embodiments, the processing device may generate further masks of the same size and shape, and with the same or different mask thresholds for successive weight tensors, such as updated weight tensors (e.g., updated weight tensor 216 in FIG. 2) generated by further updating, or training, the neural network. In some embodiments, the processing device generating the mask in block 506 may be a processor, an AI processor, a neural network pruning with cyclical sparsity system, and/or a mask generator.

In block 508, the processing device may apply the mask to a weight tensor. The processing device may compare the values of the weight tensor to the mask threshold and convert the values below the mask threshold to zero values. In some embodiments, applying the mask to a weight tensor may generate a sparse weight tensor (e.g., sparse weight tensor 214 in FIG. 2). In some embodiments, such as for decreasing sparsity of the weight tensor, the mask may be configured to not change the weight tensor and may generate a dense weight tensor. In some embodiments, such as for decreasing sparsity of the weight tensor, the processor may forego applying the mask to the weight tensor. In some embodiments, the processing device may apply the mask to the dense weight tensor received in block 504. In some embodiments, the mask may be applied to updated weight tensors generated by further updating, or training, the neural network. In some embodiments, the processing device applying the mask to the weight tensor in block 508 may be a processor, an AI processor, a neural network pruning with cyclical sparsity system, and/or a masking unit.

In block 510, the processing device may update, such as by training, the neural network using the masked weight tensor. The processing device may implement updating, or training, of the neural network by known means activating the neural network with the masked weight tensor. In some embodiments, the masked weight tensor may be a sparser weight tensor than a previous weight tensor. In some embodiments, the masked weight tensor may be a denser weight tensor than a previous weight tensor. In some embodiments, the processing device updating, such as by training, the neural network using the masked weight tensor in block 510 may be a processor, an AI processor, a neural network pruning with cyclical sparsity system, and/or a neural network trainer (e.g., neural network trainer 206 in FIG. 2).

In block 512, the processing device may generate an updated weight tensor. The processing device may generate the updated weight tensor as a result of updating, or training, the neural network in block 510. In some embodiments, the processing device generating the updated weight tensor in block 512 may be a processor, an AI processor, a neural network pruning with cyclical sparsity system, and/or a neural network trainer.

In block 514, the processing device may update counter(s) (e.g., increase sparsity counter 300, decrease sparsity counter 302 in FIG. 3). The counters may increment and keep track of a number updating, or training, cycles implemented for the neural network. The processing device may increment the counter(s) in response to an updating, or a training, cycle of the neural network. In some embodiments, the processing device updating the counter(s) in block 514 may be a processor, an AI processor, a neural network pruning with cyclical sparsity system, a mask generator, an increase sparsity counter, and/or decrease sparsity counter.

Optionally, in some embodiments, the operations in blocks 506-514 may be in a single operations, such as by a sparsity/sparsification engine or module.

In determination block 516, the processing device may determine whether to terminate neural network pruning with cyclical sparsity. In some embodiments, the processing device may determine whether to end neural network pruning with cyclical sparsity for the neural network. For example, the processing device may compare the value of the increase sparsity counter to an increase sparsity counter threshold and the value of the decrease sparsity counter to a decrease sparsity counter threshold, and terminate neural network pruning with cyclical sparsity in response to the value of the increase sparsity counter exceeding the increase sparsity counter threshold and/or the value of the decrease sparsity counter exceeding the decrease sparsity counter threshold. The values of the increase sparsity counter and the decrease sparsity counter may be the number of cycles of increasing sparsity of weight tensors and the number of cycles of decreasing sparsity of weight tensors. The increase sparsity counter threshold may be configured for a prede- termined number of cycles of increasing sparsity of weight tensors "K+1" and the decrease sparsity counter threshold may be configured for a predetermined number of cycles of decreasing sparsity of weight tensors "K," where K is a positive integer. The values of the increase sparsity counter and the decrease sparsity counter may be the number of updating, or training, cycles implemented by the neural network trainer. As another example, the processor may compare the level of sparsity used to generate the mask in block 506 to a sparsity threshold and the value of the increase sparsity counter to the increase sparsity counter threshold, and terminate neural network pruning with cycli- cal sparsity in response to both the level of sparsity used to generate the mask exceeding the sparsity threshold and the value of the increase sparsity counter exceeding the increase sparsity counter threshold. As another example, the proces- sor may compare an accuracy of the neural network to an accuracy threshold and compare the level of sparsity used to generate the mask to the sparsity threshold, and terminate neural network pruning with cyclical sparsity in response to both the accuracy of the neural network exceeding the accuracy threshold and the level of sparsity used to generate the mask exceeding the sparsity threshold. In some embodi- ments, the processor may use any number and combination of these examples to determine whether to terminate neural network pruning with cyclical sparsity. In some embodi- ments, the processing device determining whether to termi- nate neural network pruning with cyclical sparsity in deter- mination block 516 may be a processor, an AI processor, a neural network pruning with cyclical sparsity system, a mask generator, and/or a sparsity comparator (e.g., sparsity comparator 308 in FIG. 3).

In response to determining to terminate neural network pruning with cyclical sparsity (i.e., determination block 516="Yes"), the processing device may terminate neural network pruning with cyclical sparsity in block 522. In some embodiments, the processing device terminating neural net- work pruning with cyclical sparsity in block 522 may be a processor, an AI processor, a neural network pruning with cyclical sparsity system, a mask generator, and/or a sparsity comparator.

In response to determining not to terminate neural net- work pruning with cyclical sparsity (i.e., determination block 516="No"), the processing device may determine whether to increase sparsity of the updated weight tensor in determination block 518. For example, the processing device may increase sparsity of the updated weight tensor for a number of updating, or training, cycles of the neural network. As another example, the processing device may increase sparsity of the updated weight tensor until the updated weight tensor achieves a level of sparsity. As another example, the processing device may increase spar- sity of the updated weight tensor until the neural network achieves a level of accuracy and a level of sparsity for the updated weight tensor. In some embodiments, the processing device may be configured to increase sparsity of the updated weight tensor for any number and combination of the foregoing examples. In some embodiments, the processing device may impose different parameters and/or requirement for increase sparsity of weight tensors for successive cycles. While a criterion for continuing to increase sparsity of the updated weight tensor persists, the processing device may determine to increase sparsity of the updated weight tensor. In some embodiments, the processing device determining whether to increase sparsity of the updated weight tensor in determination block 518 may be a processor, an AI proces- sor, a neural network pruning with cyclical sparsity system, a mask generator, and/or an increase sparsity counter.

In response to determining to increase sparsity of the updated weight tensor (i.e., determination block 518="Yes"), the processing device may generate a mask in block 506 for the updated weight tensor generated in block 512. In some embodiments, the processing device generat- ing the mask in block 506 may be a processor, an AI processor, a neural network pruning with cyclical sparsity system, and/or a mask generator.

In response to determining not to increase sparsity of the updated weight tensor (i.e., determination block 518="No"), the processing device may determine whether to decrease sparsity of the updated weight tensor in determination block 520. For example, the processing device may decrease sparsity of the updated weight tensor following a number of updating, or training, cycles of the neural network. As another example, the processing device may decrease spar- sity of the updated weight tensor following the updated weight tensor achieving a level of sparsity. As another example, the processing device may decrease sparsity of the updated weight tensor following the neural network achiev- ing a level of accuracy and a level of sparsity for the updated weight tensor. In some embodiments, the processing device may be configured to decrease sparsity of the updated weight tensor for any number and combination of the foregoing examples. In some embodiments, processing device may impose different parameters and/or requirement for decreasing sparsity of the updated weight tensor for successive cycles. While a criterion for decreasing sparsity of the updated weight tensor is met, the processing device may determine to decreasing sparsity the updated weight tensor. In some embodiments, the processing device deter- mining whether to decrease sparsity the updated weight tensor in determination block 520 may be a processor, an AI processor, a neural network pruning with cyclical sparsity system, a mask generator, and/or a decrease sparsity counter.

In response to determining to decrease sparsity of the updated weight tensor (i.e., determination block 520="Yes"), the processing device may generate a mask in block 506 for the updated weight tensor generated in block 512. In some embodiments, the processing device generat- ing the mask in block 506 may be a processor, an AI processor, a neural network pruning with cyclical sparsity system, and/or a mask generator.

In response to determining not to decrease sparsity of the updated weight tensor (i.e., determination block 520="No"), the processing device may apply the mask to a weight tensor in block 508 for the updated weight tensor generated in block 512. In some embodiments, the processing device applying the mask to the weight tensor in block 508 may be a processor, an AI processor, a neural network pruning with cyclical sparsity system, and/or a masking unit.

Figure 6:
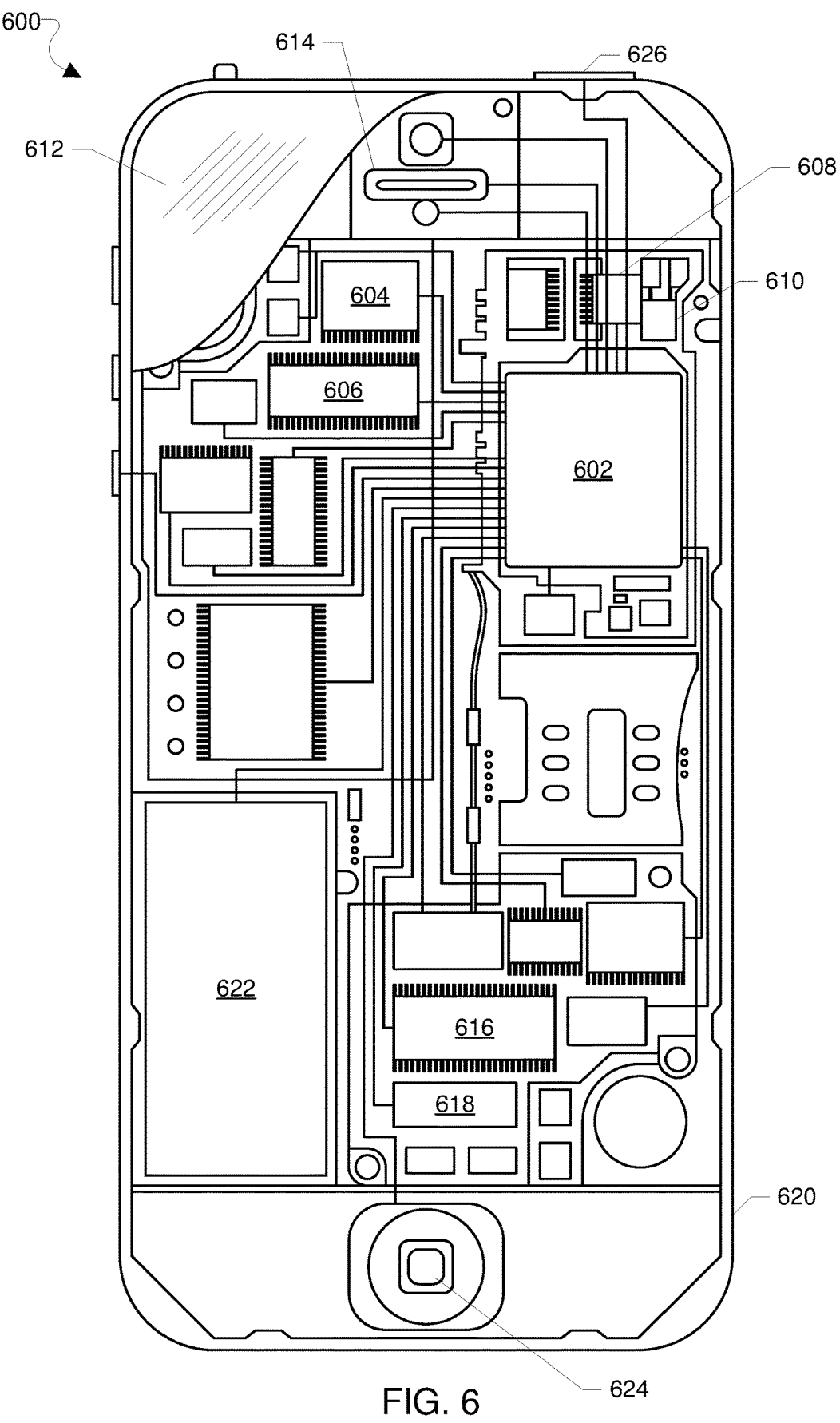
FIG. 6 is a component block diagram illustrating an example mobile computing device suitable for implementing the various embodiments.

Methods and devices for implementing such methods in accordance with the various embodiments (including, but not limited to, embodiments described above with reference to FIGS. 1-5) may be implemented in a wide variety of computing systems including mobile computing devices, an example of which suitable for use with the various embodiments is illustrated in FIG. 6. The mobile computing device 600 may include a processor 602 coupled to a touchscreen controller 604 and an internal memory 606. The processor 602 may be one or more multicore integrated circuits designated for general or specific processing tasks. The internal memory 606 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the mobile computing device 600 need not have touch screen capability.

The mobile computing device 600 may have one or more radio signal transceivers 608 (e.g., Peanut, Bluetooth, Zig-Bee, Wi-Fi, RF radio) and antennae 610, for sending and receiving communications, coupled to each other and/or to the processor 602. The transceivers 608 and antennae 610 may be used with the above-mentioned circuitry to implement the various wireless transmission protocol stacks and interfaces. The mobile computing device 600 may include a cellular network wireless modem chip 616 that enables communication via a cellular network and is coupled to the processor.

The mobile computing device 600 may include a peripheral device connection interface 618 coupled to the processor 602. The peripheral device connection interface 618 may be singularly configured to accept one type of connection, or may be configured to accept various types of physical and communication connections, common or proprietary, such as Universal Serial Bus (USB), FireWire, Thunderbolt, or PCIe. The peripheral device connection interface 618 may also be coupled to a similarly configured peripheral device connection port (not shown).

The mobile computing device 600 may also include speakers 614 for providing audio outputs. The mobile computing device 600 may also include a housing 620, constructed of a plastic, metal, or a combination of materials, for containing all or some of the components described herein. The mobile computing device 600 may include a power source 622 coupled to the processor 602, such as a disposable or rechargeable battery. The rechargeable battery may also be coupled to the peripheral device connection port to receive a charging current from a source external to the mobile computing device 600. The mobile computing device 600 may also include a physical button 624 for receiving user inputs. The mobile computing device 600 may also include a power button 626 for turning the mobile computing device 600 on and off.

Figure 7:
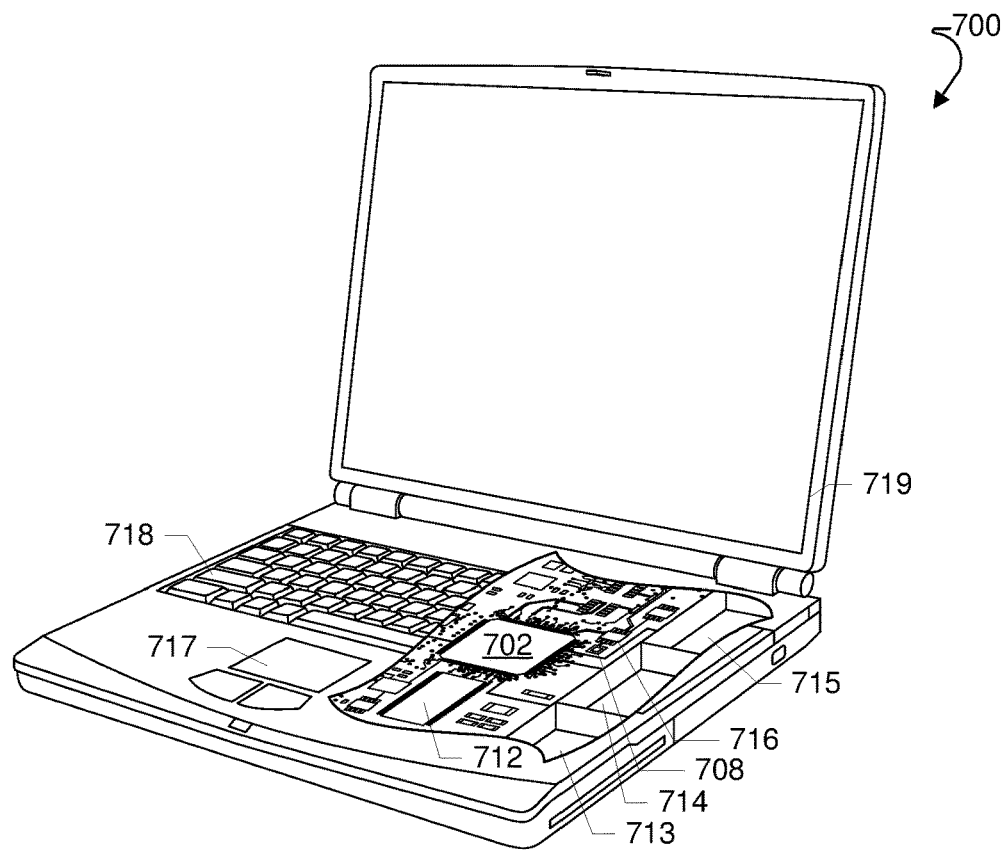
FIG. 7 is a component block diagram illustrating an example mobile computing device suitable for implementing the various embodiments.

Methods and devices for implementing such methods in accordance with the various embodiments (including, but not limited to, embodiments described above with reference to FIGS. 1-5) may be implemented in a wide variety of computing systems include a laptop computer 700 an example of which is illustrated in FIG. 7. A laptop computer 700 will typically include a processor 702 coupled to volatile memory 712 and a large capacity nonvolatile memory, such as a compact disc (CD) drive 713 or Flash memory. Additionally, the computer 700 may have one or more antenna 708 for sending and receiving electromagnetic radiation that may be connected to a wireless data link and/or cellular telephone transceiver 716 coupled to the processor 702. The computer 700 may also include a floppy disc drive 714 and a CD drive 713 coupled to the processor 702. In a notebook configuration, the computer housing may include a battery 715, a touchpad touch surface 717 that serves as the computer's pointing device, a keyboard 718, and a display 719 all coupled to the processor 702. Other configurations of the computing device may include a computer mouse or trackball coupled to the processor (e.g., via a USB input) as are well known, which may also be used in conjunction with the various embodiments.

Figure 8:
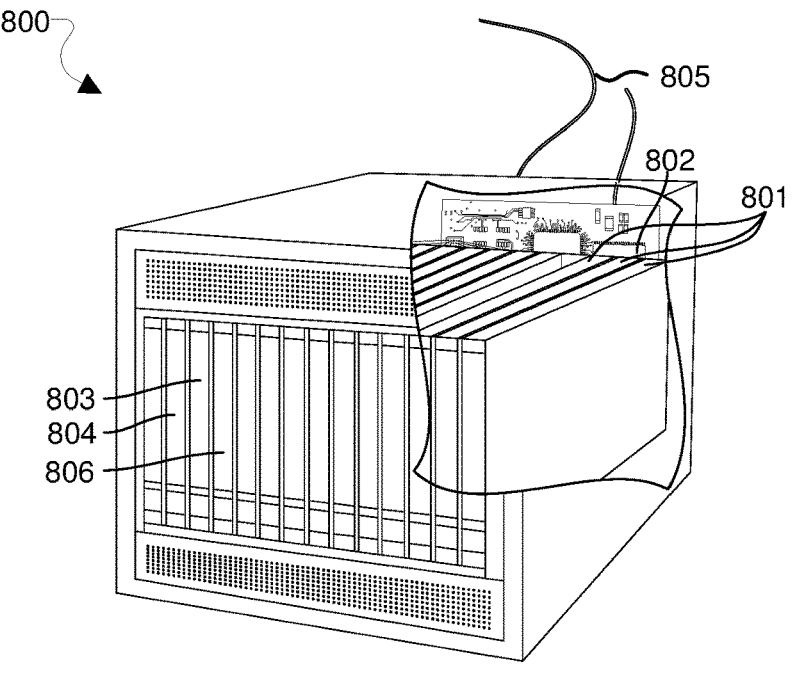
FIG. 8 is a component block diagram illustrating an example server suitable for implementing the various embodiments.

Methods and devices for implementing such methods in accordance with the various embodiments (including, but not limited to, embodiments described above with reference to FIGS. 1-5) may also be implemented in fixed computing systems, such as any of a variety of commercially available servers. An example server 800 is illustrated in FIG. 8. Such a server 800 typically includes one or more multicore processor assemblies 801 coupled to volatile memory 802 and a large capacity nonvolatile memory, such as a disk drive 804. As illustrated in FIG. 8, multicore processor assemblies 801 may be added to the server 800 by inserting them into the racks of the assembly. The server 800 may also include a floppy disc drive, compact disc (CD) or digital versatile disc (DVD) disc drive 806 coupled to the processor 801. The server 800 may also include network access ports 803 coupled to the multicore processor assemblies 801 for establishing network interface connections with a network 805, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Implementation examples are described in the following paragraphs. While some of the following implementation examples are described in terms of example methods, further example implementations may include: the example methods discussed in the following paragraphs implemented by a computing device comprising a processing device configured with processor-executable instructions to perform operations of the example methods; the example methods discussed in the following paragraphs implemented by a computing device including means for performing functions of the example methods; and the example methods discussed in the following paragraphs implemented as a non-transitory processor-readable storage medium having stored thereon processor-executable instructions configured to cause a processor of a computing device to perform the operations of the example methods.

Example 1. A method, including receiving as an input a weight tensor for a neural network, increasing a level of sparsity of the weight tensor generating a sparse weight tensor, updating the neural network using the sparse weight tensor generating an updated weight tensor, decreasing a level of sparsity of the updated weight tensor generating a dense weight tensor, increasing the level of sparsity of the dense weight tensor generating a final sparse weight tensor, and using the neural network with the final sparse weight tensor to generate inferences.

Example 2. The method of example 1, including repeating a predetermined K number of times: increasing the level of sparsity of the weight tensor generating the sparse weight tensor, updating the neural network using the sparse weight tensor generating the updated weight tensor, and decreasing the level of sparsity of the updated weight tensor generating the dense weight tensor, in which increasing the level of sparsity of the dense weight tensor includes increasing the level of sparsity of the dense weight tensor following a Kth time, and decreasing the level of sparsity of the updated weight tensor includes decreasing the level of sparsity of the updated weight tensor to a predetermined level of sparsity.

Example 3. The method of any of examples 1 or 2, in which the sparse weight tensor is a first sparse weight tensor and in which the updated weight tensor is a first updated weight tensor, the method including increasing a level of sparsity of the first sparse weight tensor generating a second sparse weight tensor, and updating the neural network using the second sparse weight tensor generating a second updated weight tensor, in which decreasing the level of sparsity of the updated weight tensor includes decreasing the level of sparsity of the second updated weight tensor.

Example 4. The method of any of examples 1-3, including determining whether to increase the level of sparsity of the weight tensor, in which increasing the level of sparsity of the weight tensor includes increasing the level of sparsity of the weight tensor in response to determining to increase the level of sparsity of the weight tensor.

Example 5. The method of example 4, in which determining whether to increase the level of sparsity of the weight tensor includes determining whether an increase sparsity counter exceeds an increase sparsity counter threshold and, increasing the level of sparsity of the weight tensor includes increasing the level of sparsity of the weight tensor in response to determining that the increase sparsity counter exceeds the increase sparsity counter threshold.

Example 6. The method of example 5, including incrementing the increase sparsity counter for a cycle of updating the neural network.

Example 7. The method of any of examples 1-6, in which increasing the level of sparsity of the weight tensor includes applying a mask to the weight tensor configured to convert a non-zero value of the weight tensor below a mask threshold to a zero value.

Example 8. The method of any of examples 1-7, in which decreasing the level of sparsity of the updated weight tensor includes updating the neural network using the updated weight tensor.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein

What is claimed is:

1. A method performed by a computing device, comprising:

receiving as an input a weight tensor for a neural network and a sparsity parameter associated with a rate of adjusting sparsity of the weight tensor, wherein the rate is based on a training cycle of the neural network;

increasing, based on the sparsity parameter, a level of sparsity of the weight tensor at the rate associated with the training cycle to generate a sparse weight tensor;

updating the neural network using the sparse weight tensor to generate an updated weight tensor;

decreasing, based on the sparsity parameter, a level of sparsity of the updated weight tensor at the rate associated with the training cycle to generate a dense weight tensor;

increasing, based on the sparsity parameter, the level of sparsity of the dense weight tensor at the rate associated with the training cycle to generate a final sparse weight tensor; and using the neural network with the final sparse weight tensor to generate inferences.

2. The method of claim 1, further comprising repeating a predetermined K number of times:

increasing the level of sparsity of the weight tensor to generate the sparse weight tensor;

updating the neural network using the sparse weight tensor to generate the updated weight tensor; and decreasing the level of sparsity of the updated weight tensor to generate the dense weight tensor, wherein:

increasing the level of sparsity of the dense weight tensor comprises increasing the level of sparsity of the dense weight tensor following a Kth time, and decreasing the level of sparsity of the updated weight tensor comprises decreasing the level of sparsity of the updated weight tensor to a predetermined level of sparsity.

3. The method of claim 1, wherein the sparse weight tensor is a first sparse weight tensor and wherein the updated weight tensor is a first updated weight tensor, the method further comprising:

increasing a level of sparsity of the first sparse weight tensor to generate a second sparse weight tensor; and updating the neural network using the second sparse weight tensor to generate a second updated weight tensor, wherein decreasing the level of sparsity of the updated weight tensor comprises decreasing the level of sparsity of the second updated weight tensor.

4. The method of claim 1, further comprising determining whether to increase the level of sparsity of the weight tensor, wherein increasing the level of sparsity of the weight tensor comprises increasing the level of sparsity of the weight tensor in response to determining to increase the level of sparsity of the weight tensor.

5. The method of claim 4, wherein:

determining whether to increase the level of sparsity of the weight tensor comprises determining whether an increase sparsity counter exceeds an increase sparsity counter threshold; and increasing the level of sparsity of the weight tensor comprises increasing the level of sparsity of the weight tensor in response to determining that the increase sparsity counter exceeds the increase sparsity counter threshold.

6. The method of claim 5, further comprising incrementing the increase sparsity counter for a cycle of updating the neural network.

7. The method of claim 1, wherein increasing the level of sparsity of the weight tensor comprises applying a mask to the weight tensor configured to convert a non-zero value of the weight tensor below a mask threshold to a zero value.

8. The method of claim 1, wherein decreasing the level of sparsity of the updated weight tensor comprises updating the neural network using the updated weight tensor.

9. A computing device, comprising a processing device configured to perform operations comprising:

receiving as an input a weight tensor for a neural network and a sparsity parameter associated with a rate of adjusting sparsity of the weight tensor, wherein the rate is based on a training cycle of the neural network;

increasing, based on the sparsity parameter, a level of sparsity of the weight tensor at the rate associated with the training cycle to generate a sparse weight tensor;

updating the neural network using the sparse weight tensor generating an updated weight tensor;

decreasing, based on the sparsity parameter, a level of sparsity of the updated weight tensor at the rate associated with the training cycle to generate a dense weight tensor;

increasing, based on the sparsity parameter, the level of sparsity of the dense weight tensor at the rate associated with the training cycle to generate a final sparse weight tensor; and using the neural network with the final sparse weight tensor to generate inferences.

10. The computing device of claim 9, wherein the processing device is configured to perform operations further comprising repeating a predetermined K number of times:

increasing the level of sparsity of the weight tensor to generate the sparse weight tensor;

updating the neural network using the sparse weight tensor to generate the updated weight tensor; and decreasing the level of sparsity of the updated weight tensor to generate the dense weight tensor, wherein:

increasing the level of sparsity of the dense weight tensor comprises increasing the level of sparsity of the dense weight tensor following a Kth time, and decreasing the level of sparsity of the updated weight tensor comprises decreasing the level of sparsity of the updated weight tensor to a predetermined level of sparsity.

11. The computing device of claim 9, wherein the sparse weight tensor is a first sparse weight tensor and wherein the updated weight tensor is a first updated weight tensor, and wherein the processing device is configured to perform operations further comprising:

increasing a level of sparsity of the first sparse weight tensor to generate a second sparse weight tensor; and updating the neural network using the second sparse weight tensor to generate a second updated weight tensor, wherein decreasing the level of sparsity of the updated weight tensor comprises decreasing the level of sparsity of the second updated weight tensor.

12. The computing device of claim 9, wherein the processing device is configured to perform operations further comprising determining whether to increase the level of sparsity of the weight tensor, wherein increasing the level of sparsity of the weight tensor comprises increasing the level of sparsity of the weight tensor in response to determining to increase the level of sparsity of the weight tensor.

13. The computing device of claim 12, wherein the processing device is configured to perform operations such that:

determining whether to increase the level of sparsity of the weight tensor comprises determining whether an increase sparsity counter exceeds an increase sparsity counter threshold; and increasing the level of sparsity of the weight tensor comprises increasing the level of sparsity of the weight tensor in response to determining that the increase sparsity counter exceeds the increase sparsity counter threshold.

14. The computing device of claim 13, wherein the processing device is configured to perform operations further comprising incrementing the increase sparsity counter for a cycle of updating the neural network.

15. The computing device of claim 9, wherein the processing device is configured to perform operations such that increasing the level of sparsity of the weight tensor comprises applying a mask to the weight tensor configured to convert a non-zero value of the weight tensor below a mask threshold to a zero value.

16. The computing device of claim 9, wherein the processing device is configured to perform operations such that decreasing the level of sparsity of the updated weight tensor comprises updating the neural network using the updated weight tensor.

17. A computing device, comprising:

means for receiving as an input a weight tensor for a neural network and a sparsity parameter associated with a rate of adjusting sparsity of the weight tensor, wherein the rate is based on a training cycle of the neural network;

means for increasing, based on the sparsity parameter, a level of sparsity of the weight tensor at the rate associated with the training cycle to generate a sparse weight tensor;

means for updating the neural network using the sparse weight tensor generating an updated weight tensor;

means for decreasing, based on the sparsity parameter, a level of sparsity of the updated weight tensor at the rate associated with the training cycle to generate a dense weight tensor;

means for increasing, based on the sparsity parameter, the level of sparsity of the dense weight tensor at the rate associated with the training cycle to generate a final sparse weight tensor; and means for using the neural network with the final sparse weight tensor to generate inferences.

18. The computing device of claim 17, further comprising means for repeating a predetermined K number of times:

means for increasing the level of sparsity of the weight tensor to generate the sparse weight tensor;

means for updating the neural network using the sparse weight tensor to generate the updated weight tensor; and means for decreasing the level of sparsity of the updated weight tensor generating the dense weight tensor, wherein:

means for increasing the level of sparsity of the dense weight tensor comprises means for increasing the level of sparsity of the dense weight tensor following a Kth time, and means for decreasing the level of sparsity of the updated weight tensor comprises means for decreasing the level of sparsity of the updated weight tensor to a predetermined level of sparsity.

19. The computing device of claim 17, wherein the sparse weight tensor is a first sparse weight tensor and wherein the updated weight tensor is a first updated weight tensor, the computing device further comprising:

means for increasing a level of sparsity of the first sparse weight tensor to generate a second sparse weight tensor; and means for updating the neural network using the second sparse weight tensor to generate a second updated weight tensor, wherein means for decreasing the level of sparsity of the updated weight tensor comprises means for decreasing the level of sparsity of the second updated weight tensor.

20. The computing device of claim 17, further comprising means for determining whether to increase the level of sparsity of the weight tensor, wherein means for increasing the level of sparsity of the weight tensor comprises means for increasing the level of sparsity of the weight tensor in response to determining to increase the level of sparsity of the weight tensor.

21. The computing device of claim 20, wherein:

means for determining whether to increase the level of sparsity of the weight tensor comprises means for determining whether an increase sparsity counter exceeds an increase sparsity counter threshold; and means for increasing the level of sparsity of the weight tensor comprises means for increasing the level of sparsity of the weight tensor in response to determining that the increase sparsity counter exceeds the increase sparsity counter threshold.

22. The computing device of claim 21, further comprising means for incrementing the increase sparsity counter for a cycle of updating the neural network.

23. The computing device of claim 17, wherein means for increasing the level of sparsity of the weight tensor comprises means for applying a mask to the weight tensor configured to convert a non-zero value of the weight tensor below a mask threshold to a zero value.

24. The computing device of claim 17, wherein means for decreasing the level of sparsity of the updated weight tensor comprises means for updating the neural network using the updated weight tensor.

25. A non-transitory processor-readable medium having stored thereon processor-executable instructions configured to cause a processing device to perform operations comprising:

receiving as an input a weight tensor for a neural network and a sparsity parameter associated with a rate of adjusting sparsity of the weight tensor, wherein the rate is based on a training cycle of the neural network;

increasing, based on the sparsity parameter, a level of sparsity of the weight tensor at the rate associated with the training cycle to generate a sparse weight tensor;

updating the neural network using the sparse weight tensor to generate an updated weight tensor;

decreasing, based on the sparsity parameter, a level of sparsity of the updated weight tensor at the rate associated with the training cycle to generate a dense weight tensor;

increasing, based on the sparsity parameter, the level of sparsity of the dense weight tensor at the rate associated with the training cycle to generate a final sparse weight tensor; and using the neural network with the final sparse weight tensor to generate inferences.

26. The non-transitory processor-readable medium of claim 25, wherein the stored processor-executable instructions are configured to cause the processing device to perform operations further comprising repeating a predetermined K number of times:

increasing the level of sparsity of the weight tensor generating the sparse weight tensor;

updating the neural network using the sparse weight tensor to generate the updated weight tensor; and decreasing the level of sparsity of the updated weight tensor to generate the dense weight tensor, wherein:

increasing the level of sparsity of the dense weight tensor comprises increasing the level of sparsity of the dense weight tensor following a Kth time, and decreasing the level of sparsity of the updated weight tensor comprises means for decreasing the level of sparsity of the updated weight tensor to a predetermined level of sparsity.

27. The non-transitory processor-readable medium of claim 25, wherein the sparse weight tensor is a first sparse weight tensor and wherein the updated weight tensor is a first updated weight tensor, and wherein the stored processor-executable instructions are configured to cause the processing device to perform operations further comprising:

increasing a level of sparsity of the first sparse weight tensor to generate a second sparse weight tensor; and updating the neural network using the second sparse weight tensor to generate a second updated weight tensor, wherein decreasing the level of sparsity of the updated weight tensor comprises decreasing the level of sparsity of the second updated weight tensor.

28. The non-transitory processor-readable medium of claim 25, wherein the stored processor-executable instructions are configured to cause the processing device to perform operations further comprising determining whether to increase the level of sparsity of the weight tensor, wherein increasing the level of sparsity of the weight tensor comprises increasing the level of sparsity of the weight tensor in response to determining to increase the level of sparsity of the weight tensor.

29. The non-transitory processor-readable medium of claim 25, wherein the stored processor-executable instructions are configured to cause the processing device to perform operations such that increasing the level of sparsity of the weight tensor comprises applying a mask to the weight tensor configured to convert a non-zero value of the weight tensor below a mask threshold to a zero value.

30. The non-transitory processor-readable medium of claim 25, wherein the stored processor-executable instructions are configured to cause the processing device to perform operations further comprising such that decreasing the level of sparsity of the updated weight tensor comprises updating the neural network using the updated weight tensor.

* * * * *